Figure 1:
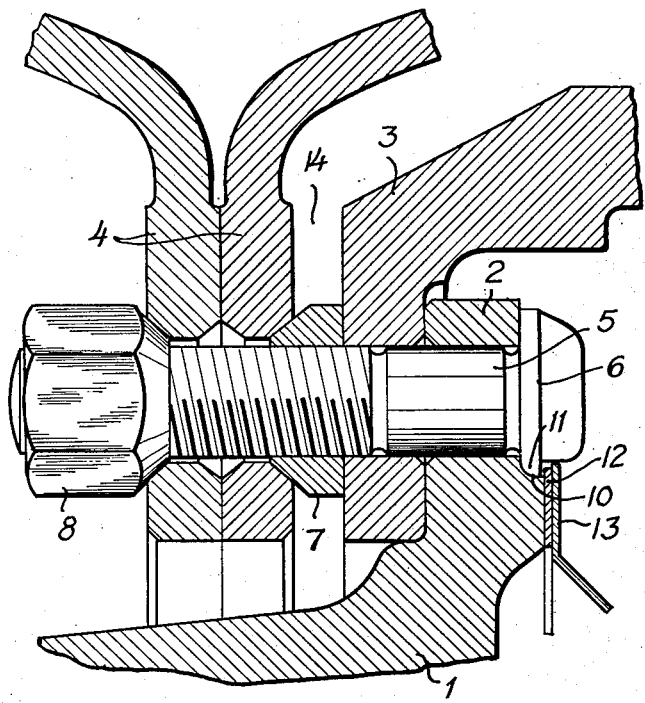

March 10, 1959  F. G. H. HEDLUND ET AL  2,877,054
WHEEL DISK AND HUB ASSEMBLY
Filed June 24, 1953

Inventors
Folke Gustaf Hjalmar Hedlund
Lars Gunnar Valter Luthman
By their attorneys Howson and Howson

United States Patent Office 2,877,054
Patented Mar. 10, 1959

2,877,054

WHEEL DISK AND HUB ASSEMBLY

Folke Gustaf Hjalmar Hedlund, Johanneshov, and Lars Gunnar Valter Luthman, Sodertalje, Sweden, assignors to Aktiebolaget Scania-Vabis, Sodertalje, Sweden, a corporation of Sweden Application June 24, 1953, Serial No. 363,798

Claims priority, application Sweden July 9, 1952

6 Claims. (Cl. 301—9)

This invention relates to a wheel disk and hub assembly, particularly for motor vehicles, in which one or more wheel disks are secured to a hub flange by means of a number of wheel retaining bolts secured against turning movement and axial outward displacement.

Wheel disk and hub assemblies of this type are in practical service in a variety of different constructions. Especially in heavy vehicles, such assemblies are subjected to considerable stresses which involve difficulties in the design of the assemblies. According to a well-known construction, the retaining bolts are provided with heads at their inner ends and have a portion of the shank provided with flutes or grooves to secure the bolts to the hub flange. The fluted or grooved portion has initially a slightly greater diameter than the bolt aperture in the hub flange such that the bolt after having been driven into the hub flange from the inner side thereof is prevented from turning in the aperture. The wheel disk or disks are clamped between two resilient washers mounted on the bolts and having conical or spherical contact faces, the inner washer abutting against the brake drum which bears against the hub flange, while the outer washer rests against a nut threaded onto the outer end of the bolt. The construction suffers, however, from a number of inconveniences. It has developed that the frictional engagement between the hub flange and the bolts is not sufficient in case of heavy stresses so that the bolts will eventually loosen. In this case, it is common practice to weld the loosened bolts to the hub flange, but to achieve this the entire wheel and the brake drum must be removed.

Experience also has proved that the resilient washers are liable to get stuck to the bolts and thereby render difficult complete tightening of the bolts. They also are rapidly worn at their faces contacting the wheel disk and the nut. Another inconvenience is due to the fact that the disk or disks abut against the flange of the brake drum without noticeable clearance, thus eliminating the possibility of providing access for cooling air to the brake drum. Finally, this construction suffers from an inconvenience also apparent in other known constructions and consisting in that the assembly has a tendency towards loosening as a result of very slight relative movements between the bolt and washer and the nut. This relative movement which occurs on account of very slight clearances and deformations in a similar manner as, for instance, in the races of antifriction bearings, results in the bolt retaining nuts on the right side of the vehicle having a tendency to turn in a clock-wise direction as viewed from the outer side of the wheel, whereas the nuts on the left side have a tendency to turn in a counter-clockwise direction. For this reason, the wheel retaining bolts for heavy vehicles are usually provided with right-hand threads on the right side and with left-hand threads on the left side. Nevertheless, the risk of loosening of the assembly as a result of wear occurring because of slight relative movements in the entire assembly is not eliminated, especially if the various parts are not very carefully assembled.

In another well-known construction, the inconveniences caused by resilient washers are avoided by clamping the wheel disk or wheel disks between non-resilient faces on the bolt and nut so that the bolts can be more safely tightened. In addition, the number of abutting faces in the assembly is reduced, which is of great advantage, since the assembly will in general be more durable if it comprises fewer abutting faces. Further, this construction offers the possibility of providing a clearance between the disk and the brake drum for the passage of cooling air. However, in this case the hub flange will be subject to considerable bending stresses, and additional screw connections are required to connect the brake drum to the hub flange. In this construction, the bolts are secured against turning movement by means of locking rivets provided between the bolts and the hub flange. Such rivets are however not durable under heavy stresses. The risk of loosening of the assembly as a result of slight clearances and deformations is not prevented in this construction.

According to another known construction, an inner wheel disk is secured in place by means of a number of nuts having internal and external threads and being threaded onto the retaining bolts. Thereupon an outer wheel disk is mounted and secured by means of other nuts threaded upon the first-named nuts. This construction does not eliminate the above named risk of loosening of the assembly and is rather expensive in manufacture and difficult to assemble. The threads on the bolts must have a considerable length. Since one nut is threaded onto the other one, two different socket wrenches are required when a wheel has to be changed. Further, there is no possibility of providing a clearance for cooling air at the inner side of the wheel disks.

It has also been suggested that a non-resilient washer be provided between the brake drum and the wheel disk and that the disk be clamped between this washer and the nut, but in this case the number of abutting faces in the assembly is again increased, while there is still the risk of loosening of the assembly.

The object of the invention is to provide a wheel disk and hub assembly, particularly for heavy motor vehicles, which eliminates the above described inconveniences.

Figure 2:
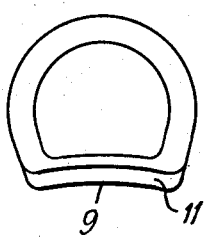

We attain this object by construction illustrated in the annexed drawing in which:

Fig. 1 is a sectional view of a wheel disk and hub assembly for the rear wheels of a bus or truck, and Fig. 2 illustrates the head of a bolt as viewed from the right in Fig. 1.

Referring to Fig. 1, numeral 1 indicates the hub and numeral 2 the flange of the hub, numeral 3 the brake drum and numeral 4 two wheel disks. These parts are held together by means of bolts 5 having two nuts 7 and 8.

The head 6 of each bolt abuts against the inner or rear face of the hub flange 2. On part of its circumference, the head has a concave face 9 which engages a corresponding convex face 10 on the hub flange. Both of said faces may be part of a cylindrical face the axis of which is coinciding with the axis of rotation of the wheel. The interengaging faces 9 and 10 securely prevent the bolt from turning movements. The head of the bolt has a projecting portion 11 on the inner side of which there is provided a gasket 12 and an oil catcher 13 such as to prevent the bolt from being unintentionally pushed inwards when a wheel is changed.

The nut 7 keeps the bolt 5 and the brake drum 3 in engagement with the flange 2. The disks 4 are directly clamped between the nuts 8 and 7. When changing a wheel, the nut 7 need obviously not be loosened. Since both nuts have the same width, the socket wrench for loosening and tightening the nut 8 can also be used to retighten the nut 7.

Amongst the advantages obtained by the construction according to the invention it may be pointed out that the comparatively small number of abutting faces and the absence of resilient washers or similar members provide for a very rigid assembly which will not loosen on account of slight relative movements and deformations. If, in accordance with usual practice in heavy vehicles, bolts with right-hand threads are used on the right side of the vehicle and bolts with left-hand threads on the left side, and if the nuts of the assembly should happen to be not completely tightened or if they loosen as the assembly settles during service, the above named slight clearances and deformations will work to tighten the nuts completely. As a matter of fact, the inner nut 7 when not completely tightened will first begin to screw itself inwards on the bolt, since the pressure of contact between the threads of the nut 7 and the bolt 5 is smaller than the corresponding pressure at the outer nut 8, the contact pressure at the inner nut being relieved when the outer nut is tightened. The nuts will thus tighten themselves in the proper order. As a result, careless assembling will have no serious effect on the assembly.

Due to the arrangement of the nut 7 between the wheel disks and the brake drum, there is obtained a passage 14 for cooling air without the hub flange being subject to undue bending stresses, since the nut 7, the brake drum and the hub flange constitute a rigid unit together with the bolt. The brake drum can be secured in place by means of the nuts of the wheel disk and hub assembly, avoiding the necessity of providing additional screw connections as is the case in other constructions having a clearance for cooling air. When a wheel is changed all of the nuts of the assembly are accessible for complete tightening. In combination with the above named security against turning of the bolts, the invention thus provides a simple and reliable wheel disk and hub assembly which eliminates all of the above indicated inconveniences inherent in known constructions.

What we claim is:

1. A wheel disk and hub assembly comprising a wheel disk and a hub having a flange portion, a plurality of wheel retaining bolts extending through the hub flange, means positively securing said bolts against turning movement and axial outward displacement, a first nut screwed onto each bolt to secure the bolt to the hub flange, and a second nut also screwed onto the bolt, said disk being clamped solely between both of said nuts.

2. A wheel disk and hub assembly comprising a wheel disk and a hub having a flange portion, a plurality of wheel retaining bolts extending through the hub flange, means securing said bolts against turning movement and axial outward displacement, a brake drum having an apertured flange abutting against the outer face of said hub flange, a first nut screwed onto each bolt to secure the bolt to the hub flange and abutting directly against the flange of the brake drum, and a second nut also screwed onto the bolt, said disk being clamped directly between both of said nuts.

3. A wheel disk and hub assembly comprising a wheel disk and a hub having a flange portion, a plurality of wheel retaining bolts extending through the hub flange, a brake drum having an apertured flange abutting against the outer face of said hub flange, a first nut screwed onto each bolt to secure the bolt to the hub flange and abutting directly against the flange of the brake drum and spacing said wheel disk apart from the brake drum, and a second nut also screwed onto the bolt, said disk being clamped directly between said nuts.

4. A wheel disk and hub assembly comprising a wheel disk and a hub having a flange portion, a plurality of wheel retaining bolts extending through the hub flange, each bolt having a head abutting against the inner side of the hub flange and having a concave face on part of its circumference, a corresponding convex face on the hub flange, said faces engaging each other and forming part of a cylindrical face having its axis coinciding with the axis of rotation of the wheel, a first nut screwed onto each bolt to secure the bolt to the hub flange, and a second nut also screwed onto the bolt, said disk being clamped directly between said nuts.

5. A wheel disk and hub assembly comprising a wheel disk and a hub having a flange portion, a plurality of wheel retaining bolts extending through the hub flange, means securing said bolts against turning movement and axial outward displacement, an oil catcher for wheel bearing oil located between the head of the bolt and the hub flange and arranged to prevent inward displacement of the bolts, a first nut screwed onto each bolt to secure the bolt to the hub flange, and a second nut also screwed onto the bolt, said disk being clamped directly between both of said nuts.

6. A wheel disk and hub assembly comprising a wheel disk and a hub having a flange portion, a plurality of wheel retaining bolts extending through the hub flange, means securing said bolts against turning movement and axial outward displacement, in combination with an oil catcher for wheel bearing oil mounted on the flange of the hub in overlapping relation with the bolts, thereby preventing inward displacement of the bolts, a first nut screwed onto each bolt to secure the bolt to the hub flange, and a second nut, said disk being clamped directly between said nuts at each bolt.

References Cited in the file of this patent
UNITED STATES PATENTS

| | | |
|---|---|---|
| 1,637,666 | Tarbox | Aug. 2, 1927 |
| 1,963,229 | Eksergian | June 19, 1934 |
| 2,404,520 | Mosher | July 23, 1946 |
| 2,631,894 | Horn | Mar. 17, 1953 |